United States Patent [19]
Peterson

[11] 3,879,503
[45] Apr. 22, 1975

[54] SCINTILLATION ANALYSIS SYSTEM
[75] Inventor: John I. Peterson, Falls Church, Va.
[73] Assignee: The United States of America as represented by the Secretary of the Department of Health, Education and Welfare, Washington, D.C.
[22] Filed: Aug. 2, 1973
[21] Appl. No.: 384,805

Related U.S. Application Data
[62] Division of Ser. No. 76,705, Sept. 30, 1970, Pat. No. 3,776,695.

[52] U.S. Cl. .................. 261/153; 261/89; 261/112
[51] Int. Cl. ............................................. B01f 3/04
[58] Field of Search ......... 23/230 P, 230 C; 261/89, 261/153, 112

[56] References Cited
UNITED STATES PATENTS

| | | | |
|---|---|---|---|
| 294,922 | 3/1884 | Smith | 261/89 |
| 532,438 | 1/1895 | Bergquist | 261/89 |
| 797,661 | 8/1905 | Cline | 261/89 |
| 887,004 | 5/1908 | Miles | 261/89 |
| 3,428,433 | 2/1969 | Ehrenberger et al. | 23/230 PC |
| 3,506,245 | 4/1970 | Noschinski et al. | 261/89 |
| 3,607,071 | 9/1971 | Staffin et al. | 23/230 PC |

OTHER PUBLICATIONS
Peterson, John I., "A Carbon Dioxide Collection Assembly ... for Liquid Scintillation Analysis," Analytical Biochemistry 31, 204–210(1969), HEW received April 2, 1969.

Primary Examiner—Tim R. Miles

[57] ABSTRACT

A system for the combustion preparation of samples for scintillation analysis comprising a combustion tube containing a combustion catalyst, a chimney tube positioned within the combustion tube and resting on the catalyst and means for admitting a sample for combustion, oxygen gas for ignition and an outlet means for the combustion product.

The invention also includes means for collecting the combustion products comprising: for $H_2O$ an externally cooled condenser like system containing means for contacting a scintillation solvent with the gaseous combustion products in a cooled zone; and for $CO_2$ an externally cooled condenser like system containing a helical rotatable band within the inner bore thereof for distributing a scintillation solvent along the walls thereof for countercurrent contact with the $CO_2$ combustion product.

3 Claims, 3 Drawing Figures

SCINTILLATION ANALYSIS SYSTEM

This is a divisional, of application Ser. No. 76,805, filed Sept. 30, 1970, now U.S. Pat. No. 3,776,695.

BACKGROUND OF THE INVENTION

The present invention relates to a combustion system for the scintillation analysis of tritium and carbon-14.

Heretofore, various methods have been proposed for preparing samples for scintillation counting. One of the most commonly employed method is the so-called "oxygen flask procedure," originally conceived by W. Z. Hempel (Z. Angen. Chem., p. 393, (1892)). This method has been refined over the years and was most recently simplified by J. D. Davidson et al ("Advances in Tracer Methodology" (S. Rothchild Ed.), Vol. 4, p. 67, Plenum Press, N.Y., 1968).

Briefly, the "oxygen flask procedure" involves the combustion of a sample containing tritium or carbon-14 in an atmosphere of oxygen in a glass flask. The products of combustion, namely, carbon dioxide and water, are quantitatively collected employing a suitable solvent and scintillation analyzed for tritium and carbon-14. Oxygen combustion of samples, particularly biological materials, is highly desirable for liquid scintillation analysis because of the relative simplicity as compared with other methods.

There are, however, drawbacks associated with the oxygen flask procedure. These will be apparent from the following detailed description of a typical oxygen flask procedure for the scintillation analysis of a tissue sample. The primary object of the procedure is to suspend the dried sample material in the center of a confined quantity of oxygen and to effect its ignition and containment in the oxygen atmosphere with a minimal loss of heat until combustion is complete. The carbon dioxide and water produced thereby must be quantitatively collected in a measured volume of liquid scintillation counting solution.

Generally, a large heavy walled glass Erlenmeyer filter flask is employed as the combustion vessel. The dried sample is suspended in a platinum or similar non-reactive metal mesh "basket" held in place by insertion in a glass rod which is held in place by a rubber stopper in the neck of the flask. Prior to stoppering, the interior of the flask is flushed for several seconds with oxygen to provide the necessary atmosphere for combustion. The sample and holder are then positioned in place by stoppering the flask and the side arm of the flask is closed by slipping a silicone rubber tube thereover and clamping the free end. The sample is then ignited, preferably employing an infrared light beam. Combustion is generally complete in less than 1 minute. The flask is then set aside and allowed to cool for several minutes. Thereafter, the counting solvent is added to the flask. This is generally accomplished by attaching a volumetric pipette containing the measured amount of solvent to the silicone rubber tube on the sidearm of the flask. Since the pressure in the interior of the flask is always negative relative to atmospheric pressure following combustion, the solvent will be drawn into the flask upon release of the clamping means, on the tube. The flask is then swirled to distribute the solvent over the bottom and lower walls thereof and allowed to cool at about −15°C for up to about 20 minutes to permit completion of condensation. Additional solvent is delivered through the sidearm to rinse any activity which may have sequestered in the solvent that wetted the sidearm initially. The flask is again swirled to mix the solvent. A measured amount of the solution is then withdrawn for scintillation counting.

Although the aforedescribed method constitutes a great improvement over other prior art methods for the preparation of samples for scintillation analysis, there are several disadvantages associated therewith.

First, the gas volume-pressure characteristics of the combustion flask dictate the size of the sample. For a large Erlenmeyer flask (e.g., 2 liters) the upper limit on sample weight is about 100 mg. of combustible material. (Davidson, Ibid.) Accordingly, the oxygen flask procedure would be inapplicable for the analysis of a material requiring a large sample by reason of its low tritium or carbon-14 content.

Secondly, although most of the pieces of apparatus employed in the oxygen flask procedure are inexpensive, it is nonetheless necessary to employ a platinum or similar expensive non-reactive metal sample holder for positioning the sample in the oxygen atmosphere.

Thirdly, the various time-consuming manipulative steps required in the procedure, including the necessity for cleaning the system following each combustion, preclude the use of this method for analyzing a large number of samples in a short period of time.

Thus, it has been reported that a skilled worker can run only about 24 analyses per day. It is frequently necessary, however, to perform hundreds of analyses in a single series of tests. Employing the oxygen flask procedure for such analyses would require several days.

There exists, therefore, the need in the art for a simple, relatively inexpensive system for the preparation of samples for the scintillation analysis of tritium and carbon-14 by combustion which is capable of handling large sample sizes in a relatively continuous manner, thereby enabling a large number of analyses in a short period of time.

It has been recently proposed to use various adaptations of the classic microanalytical tube combustion train system (Lippman et al, Monatsch. Chem. Vol. 7, p. 9 (1886)) for preparing scintillation analysis samples. Several such systems include those proposed by Peets et al, Anal. Chem., 32, 1465 (1960); Knoche et al, Anal. Biochem. 12, 49, (1965); Tamers et al, Intern. J. Appl. Radiation Isotopes, 15, 697, (1954); Christman et al, Anal. Chem. 27, 1939 (1955); Van der Learse et al, Anal. Chim. Acta, 34, 370 (1966), and Griffith et al, Anal. Biochem., 22, 465(1968). None of these adaptations, however, were sufficiently rapid and convenient and capable of handling large samples so as to constitute a significant advance over the oxygen flask procedure.

It is an object of the present invention to provide a method which enables the rapid and efficient oxygen combustion of a great number of large samples for scintillation analysis in a short period of time.

It is a further object of the present invention to provide an improved tube combustion train which is especially adapted for igniting large scintillation analysis samples on a semi-continuous basis.

It is still a further object of the present invention to provide an improved carbon dioxide collection apparatus which is especially adapted for collecting the carbon dioxide produced by combustion in the improved tube combustion train for scintillation analysis.

SUMMARY OF THE INVENTION

The method of the present invention comprises positioning a sample of the material to be scintillation analyzed on a porous substrate, preferably containing a suitable oxidation catalyst, positioned in an elongated, vertical combustion tube which is at a point approximately midway between the open ends of the tube. This portion of the tube is maintained at a temperature sufficient to promote ignition of the sample when it is placed in position on the substrate. A verticl chimney tube preferably enlarged at the bottom and open at both ends, is positioned on the substrate over the sample coaxial with the combustion tube. A stream of oxygen is introduced near the top of the combustion tube and caused to flow through substantially the entire length of the combustion tube, the chimney tube and the porous substrate. The sample is ignited and, following complete combustion, the combustion products are swept by the oxygen stream through the combustion tube and out the bottom thereof. The chimney tube is designed to prevent upward movement of the burned material. The combustion products are then subjected to cooling, preferably in an externally cooled condenser type apparatus and contacted with a suitable scintillation solvent to effect condensation and dissolution of the active products to be analyzed. The solution is then subjected to scintillation analysis according to conventional methods.

The combustion apparatus of the present invention comprises an elongated, vertical combustion tube having a porous substrate, preferably containing a suitable oxidation catalyst positioned at a substantially intermediate point in the tube and a vertical chimney tube open at both ends and preferably enlarged at the bottom disposed within and coaxial with the combustion tube and resting on the porous substrate. The combustion tube is additionally provided with an oxygen gas inlet means near the top thereof, means for closing the top of the combustion tube and an outlet means near the bottom of the combustion tube.

The apparatus of the present invention also includes means for contacting the combustion products with a scintillation solvent depending upon the type of scintillation analysis contemplated.

When the sample is to be subjected to tritium analysis, the apparatus is provided with means for both condensing the active water component of the combustion product and effecting its dissolution in a suitable water solvent. Briefly, such means comprises a tubular jacket surrounding and coaxial with the outlet portion of the combustion tube and additionally containing a solvent inlet means whereby the solvent introduced thereby contacts the combustion products. The tubular jacket and outlet portion of the combustion tube are also in communication with an externally cooled conduit means, e.g., a condenser, wherein further condensation and dissolution of the combustion products in the scintillation solvent takes place.

Where the sample is to be subjected to active $CO_2$ analysis, the apparatus is provided with means for delivering the combustion products to the bottom portion of a carbon dioxide collector apparatus comprising an externally cooled vertical tube, e.g. condenser. Positioned within the inner bore of the vertical tube and adapted for rotation therein about its longitudinal axis is an elongated strip of inert material which has been provided with a permanent twist about its longitudinal axis to form a planar surface in the shape of a helix. The tube is closed at its upper end and provided with a suitable carbon dioxide solvent inlet means and oxygen outlet means at the top thereof and a liquid outlet means at the bottom thereof for delivering of a solution containing the active material to by analyzed. The combustion products and solvent are contacted countercurrently in the condenser like tube, the contact being enhanced by the rotation of the helix shaped element which forms a thin film of the solvent along the inner walls of the tube. The active carbon dioxide containing solution is delivered through the outlet means at the bottom of the condenser for scintillation analysis according to conventional methods.

DETAILED DESCRIPTION OF THE INVENTION

The advantages associated with the method and apparatus of the present invention will become apparent from the following description and claims and from the accompanying drawings wherein

Figure 1:
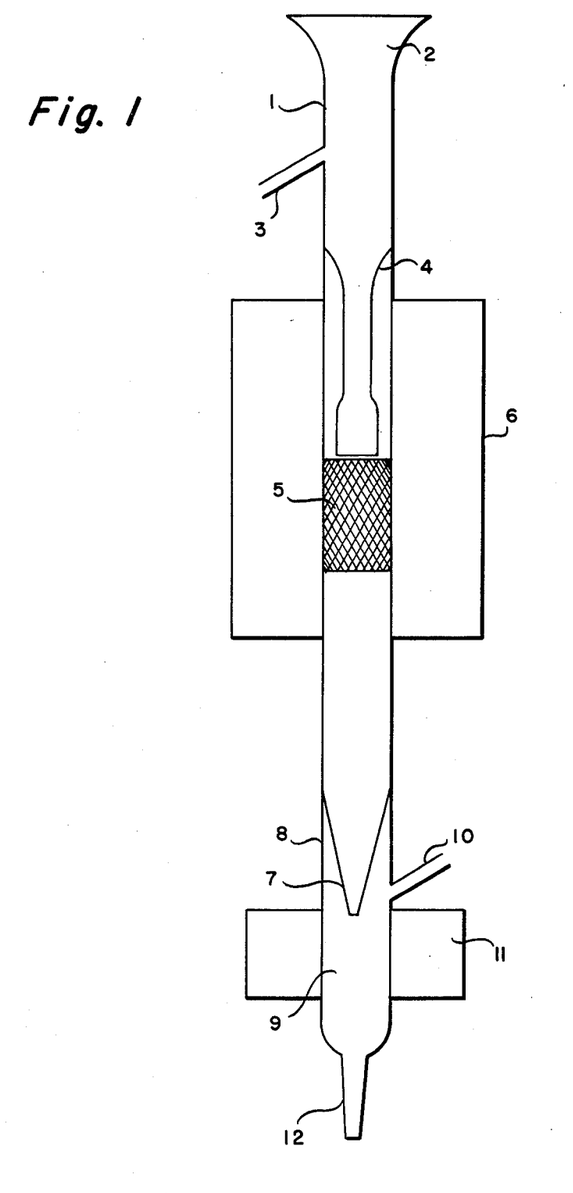
FIG. 1 is a front elevational view of one embodiment of the combustion and water collector apparatus.

Referring to the drawings, FIG. 1 illustrates a typical combustion and active water collector apparatus according to the present invention. The apparatus comprises a vertical elongated combustion tube 1 preferably composed of heat resistant glass having an opening 2 at the top for introduction of a sample of the material to be analyzed. A stoppering means, not shown, is also provided for closing the opening 2 during combustion to prevent contamination of the combustion products. The combustion tube 1 is provided at a point near the top with an oxygen gas inlet 3 in the form of a side arm tube which communicates with the interior of the combustion tube. The combustion tube 1 is provided with a suitable porous substrate 5 at a point approximately midway between the inlet opening 2 and the outlet opening 7. The substrate 5 preferably contains a porous oxidation catalyst layer below the surface upon which the sample to be ignited is positioned. Disposed within combustion tube 1 and coaxial therewith is a vertical chimney tube 4 which is open at both ends and rests upon porous substrate 5. The chimeny tube 4 is preferably enlarged at the bottom and funnel shaped at the top which terminates at a point below gas inlet means 3. The diameter of the chimeny tube 4 below the funnel shaped top portion is less than that of the inner bore of the combustion tube 1. The outer periphery of the funnel shaped top of the chimney tube may, if desired, be adapted for a close fitting relationship with the inner periphery of the inner bore of combustion tube 1. Surrounding the middle portion of the combustion tube 1 including the porous substrate 5 and the lower portion of the chimney tube 4 is a heating means 6, e.g., a furnace, which does not comprise a part of the present invention. At the lower end of the combustion tube 1 there is provided an outlet means 7, preferably in the form of the constricted end portion of the combustion tube 1.

The active water collector apparatus comprises a vertical tube or conduit means 8 coaxial with and in close fitting relationship at the top end with the lower portion of combustion tube 1 so as to form a chamber 9 into which the outlet means 7 extends. Tube 8 is provided with a scintillation solvent inlet means 10 in the form of a side arm tube which communicates with chamber 9 in said tube 8. Chamber 9 is externally cooled by a cooling element 11 and terminates in an outlet means 12.

Figure 2:
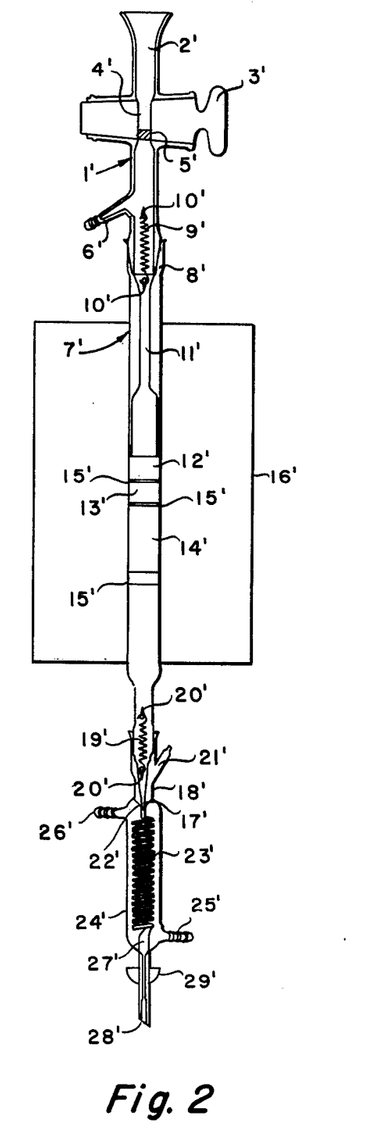
FIG. 2 is a front elevational view of a more specific embodiment of the combustion and water collector apparatus.

FIG. 2 represents a preferred embodiment of the combustion and water collector apparatus of the present invention. The apparatus comprises an elongated, vertical combustion tube in two sections 1' and 7'. The combustion section 7' and the chimney 11' to be described in more detail hereinafter are formed of quartz. All other glass portions of the apparatus are formed of heat resistant, preferably borosilicate, glass. The upper portion 2' of the upper section 1' of the combustion tube is funnel shaped to provide a sample inlet means. The tube section 1' is provided at a point just below the sample inlet means with a stopcock assembly 3'. The frictionally engaged surfaces of the stopcock assembly 3' are preferably ground and of sufficient high quality that lubrication is unnecessary, thereby avoiding contamination of the sample.

The stopcock means 3' is provided with an inner bore 4' which communicates with the inner bore of the tube section 1'. The inner bore 4' is closed at one end by means of sealing element 5' to provide a sample holding chamber within the bore 4' of the stopcock.

Just below stopcock 3', tube section 1' is provided with an oxygen gas inlet means 6' in the form of a side arm tube which communicates with the interior of tube section 1'. Oxygen gas may be supplied to the combustion tube through inlet means 6' in regulated amounts by means of a pressure regulator, needle valve and flow meter combination, not shown.

The upper section 1' of the combustion tube apparatus is joined to the lower or combustion section 7' by means of a ground glass joint 3', preferably non-lubricated. An air tight sealing of sections 1' and 7' may be enhanced by providing a tensioned spring means 9' which is attached to both sections 1' and 7' by means of hooks 10'.

Disposed within and coaxial with combustion section 7' is chimney tube 11'. Chimney 11' is open at both ends and rests on a porous bed 12' of inert chips, preferably quartz, upon which the sample material is positioned for combustion. Chimney 11' is preferably enlarged at the lower portion thereof and funnel shaped at the top. Preferably, the funnel shaped top of the chimney 11' communicates with the bottom of upper combustion tube section 1' so that most of the oxygen gas stream from inlet means 6' passes through chimney 11'. The diameter of the remainder of the chimney 11', including the enlarged lower portion thereof is less than that of the inner bore of tube section 7'. The chimney 11' is essential to the method and apparatus of the invention in that it causes the combustion of the sample to be analyzed to occur slowly and smoothly and prevents pyrolyzate from passing into and condensing in the upper section 1' of the apparatus, thereby fouling the system.

Positioned below bed 12' is a porous preliminary catalyst layer 13', preferably composed of copper oxide wire. Disposed below layer 13' is primary oxidation catalyst layer 14', preferably composed of a mixed oxide of copper and manganese (hopcalite, Lamb et al, J. Ind. Eng. Chem., 12, 213 (1920)). The layers 12', 13' and 14' are separated by means of porous elements 15', preferably composed of a heat resistant, inert material, e.g. quartz wool.

It has been found that the rapid and complete combustion of a sample in the oxygen stream cannot be obtained without the use of a catalyst. The thermal pyrolysis of a sample in the absence of a catalyst produces unburned volatile material which would be carried through the system to condense on cooler portions of the apparatus. Nor is this phenomenon completely avoided by employing extremely high temperatures. In addition, the burning of a sample in a short period of time produces so much gaseous combustion product that the oxygn atmosphere in the vicinity of the sample becomes highly diluted thereby resulting in incomplete combustion. By employing a catalyst such as a mixed oxide of copper and manganese, the necessary oxygen for complete combustion of the sample is provided by the catalyst which is then regenerated later by the oxygen stream.

The upper porous layer 12' functions as a combustion platform. The preliminary catalyst layer 13' serves to indefinitely increase the life of the primary catalyst layer 14'. The top surface of layer 13 becomes sintered from the heat of combustion following repeated ignitions and should be cleaned and/or replaced at regular intervals particularly where pyrolyzate condensation occurs in the chimney 11'. With regular inspection and frequent cleaning of layers 12' and 13', primary catalyst layer 14' should last indefinitely.

Surrounding the major portion of lower combustion tube 7' is a heating element 16' such as a tube furnace (e.g. Lindberg model 55035-A, Hevi-Duty Heating Equipment Company), which supplies the heat necessary for combustion. It is to be understood that any heating means capable of igniting the sample and maintaining combustion may be employed. Preferably, the heating means should be capable of providing a temperature of about 600°C in the region of the combustion tube surrounded by the heater.

The bottom of lower tube section 7' terminates in a constructed or tapered end portion or outlet means 17'. The furnace or heating element 16' should be positioned such that the outlet means 17' is kept sufficiently warm to evaporate water of condensation which condenses thereon during sample burning. Obviously, the furnace should also be positioned so as to prevent condensation of any type within lower tube section 7' or chimney 11'.

Attached in tight-fitting relationship with said lower tube section 7' is the water collector apparatus of the invention. The apparatus comprises a vertical tube 13' preferably composed of heat resistant borosilicate glass, coaxial with lower combustion tube 7'. The tube 18' is positioned so as to surround constricted outlet means 17' forming an open chamber extending around the outer periphery thereof. The tube 18' is joined to lower tube section 7' above outlet means 17' by means of a ground glass joint which is preferably lubricated with silicone grease. The joint is strengthened by means of tensioned spring member 19' which is, attached to lower tube section 7' and tube 18' at each end by means of hooks 20'. Tube 18' is provided with a scintillation solvent inlet means 21' in the form of a side arm tube which communicates with the interior of tube 13' above outlet means 17'. The outlet tip 17' is positioned to fit closely into the opening of collector spiral tube 23' which is disposed within vertically disposed cooling means or condenser 24'. The uppere opening of condenser 24' is positioned so as to communicate with the lower opening of tube 18' at 22'. Outlet tip 17' should be so positioned as to form a liquid trap around the end portion thereof, when solvent is introduced therein. This prevents combustion gases from entering the space between the joint 22' and the outlet means. The collector spiral tube 23' in preferably composed of glass or quartz and is coiled within condenser 24' so as to allow for maximum cooling when coolant (e.g., alcohol) is introduced into the condenser via inlet means 25' and flowed around the coil and out through outlet means 26'. Preferably, the temperature of the coolant is maintained at about 0°C by a refrigerating unit, not shown. The collector spiral tube terminates in a drain tube 27' which preferably has an internal flared portion 28' which allows the solvent to rinse the inner surfaces thereof completely without ejecting with violent splashing. A hemispherical cup member 29' is positioned in tight fitting relationship around said drain tube 27' to prevent atmospheric water condensate on the outer surface of the condenser 24' from dripping into the container employed to catch the scintillation solution sample.

Scintillation solvent passes through the collector apparatus by means of inlet 21' in regulated amounts by employing conventional liquid metering means, not shown. Suitable scintillation solvents for water include mixtures of methanol and toluene and mixtures of dioxane and toluene. It is to be understood, however, that any scintillation solvent possessing a sufficient degree of water acceptance may be employed.

The above described system may be operated as follows:

A sample of the material to be analyzed is placed into inner bore 4' of stopcock 3' through inlet means 2'. The oxygen flow is begun 1 liter per minute at 15 psig. The scintillation solvent is continuously pumped into the collector apparatus through inlet means 21' at a rate of 20 ml over a 2 minute period and the stopcock 3' is rotated so as to drop the sample onto layer 12' within chimney 11'. The primary catalyst layer 14' is preferably a 50 mm deep bed of mixed oxide of copper and manganese which has been ground and sieved to 16/30 mesh and maintained in the combustion tube at about 600°C ± 50°C by heating element 16'. The sample bursts into flame within 10 to 15 seconds, although some pyrolysis of the sample occurs with the production of combustion products prior to the appearance of a flame. Burning continues smoothly over approximately the first minute of operation. The procedure is allowed to continue for 2 minutes to ensure complete combustion of the sample and thorough rinsing of the collector coil. The tritiated water of combustion passes through outlet means 17' in vapor form, condenses and dissolves in the scintillation solvent in the collector spiral tube 23' and passes through outlet means 27' into a suitable container for scintillation analysis.

The chimney tube is essential to the operation of the apparatus. In its absence, the sample burns irregularly and partially burned materials coat the upper walls of the combustion tube. Moreover, upward movement of the combustion gasses is prevented by the nature of the flow of the oxygen down through the chimney tube.

The porous layer 12' is preferably composed of quartz which serves to shield the catalyst layer from the high temperatures of burning. The preliminary catalyst layer 13' is preferably copper oxide whereas the primary catalyst layer 14' is preferably copper and manganese.

The advantages of the method and apparatus of the invention are numerous.

First, since the combustion tube apparatus is open-ended, i.e., non-pressurized, as is the case with the above-described oxygen flask procedure there is virtually no limit on the size of the sample which may be ignited. It will be recalled from the above discussion that the sample size in the oxygen flask procedure is dictated by the gas volume-pressure characteristics of the flask. Since the present system is non-pressurized, there is not limit on the sample size other than that which may be practically introduced into the system. Whereas the oxygen flask procedure is limited to the ignition of samples whose weight is no more than about 300 mg. of combustible material, the system of the invention has been employed to ignite samples having a weight of over 500 mg. of combustible material. Accordingly, the method and apparatus of the present invention may be employed in the scintillation analysis of sample materials containing small amounts of tritium which require the utilization of large sample sizes.

Secondly, the apparatus of the present invention may be constructed of relatively inexpensive and readily available materials.

Thirdly, and probably most importantly, the method and apparatus of the present invention permit an operator to conduct a large number of sample ignitions and collections in a short period of time as compared with the oxygen flask procedure. Whereas the latter requires numerous time consuming manipulative steps including the necessity for cleaning the system following each combustion, the system of the present invention may be operated on a semi-continuous basis. Thus, following a first combustion and collection of sample, the system is immediately ready for a second combustion. All of the combustion products have been swept through the system and collected in the solvent stream and removed through the drain tube. Since there is no necessity for opening the system to contamination from the surrounding atmosphere and since perfect conditions for combustion and solvent collection are maintained by the constant oxygen and scintillation solvent flow, the system is adapted for the combustion of a new sample approximately every 3 minutes. Whereas the oxygen flask procedure is adapted to permit the combustion of only about 24 samples per day, the system of the present invention is adapted for the combustion of more than 100 samples per day.

It will be further recalled from the above discussion that several attempts have been made to modify the classic microanalytical tube combustion train system for preparing scintillation analysis samples. The present system is not to be confused with these previous modifications, however. None of the systems reported to date are capable of effecting the combustion of a great number of samples having a large size in such a short period of time.

The samples are conveniently introduced into the combustion apparatus in capsule form, i.e., enclosed in plastic or gelatin capsules. The samples may be utilized in any desired form. For example, the samples may be powdered, liquid, slurry-like, dried, etc. The system of the invention is most readily adapted for the analysis of biological samples such as tissues, etc. It is to be understood, however, that any material capable of combustion to produce active water and carbon dioxide may be prepared for scintillation analysis in the system and method of the invention.

Although the use of both gelatin and plastic capsules of various types have been employed, it has been found that capsules composed of polycarbonates are superior to any other tested. The polycarbonates combine the most valuable properties of light weight, strength, good combustion characteristics and a low contribution of scintillation quenchers. They have been found to be superior to the often used gelatin capsules which must be hardened by treatment with formaldehyde prior to use, are relatively heavy and which produce nitrogen oxides upon combustion which have a quenching effect.

Biological tissues are preferably emulsified or homogenized in water and preferably dried prior to combustion. This is most conveniently accomplished by introducing a predetermined amount of the homogenizate into the larger end of the capsule. Since the system of the invention is adapted for the combustion and collection of more than a hundred samples per day, all of the samples to be analyzed in a given period of time are preferably prepared in advance. The capsule ends are then placed on a hot plate, preferably in shallow depressions to avoid spillage, and the water content thereof evaporated by heating at about 80°–90°C.

The invention will be further illustrated by the following non-limiting examples.

In each of the following examples a furnace temperature of 600°C ± 50°C, an oxygen flow of 1.0 liters pere min. and a solvent flow of 20 ml in 2 min. were employed.

EXAMPLE 1

A liquid scintillation spectrometer (No. 4322 - Packard Instruments Co., Inc.) was employed in the following tests. The window settings used were: 40–100 at 60 percent gain for tritium counting and 1,000 to infinity at 6 percent gain for the automatic external standardization count (AES). These settings provided a closely proportional relation between sample counting efficiency and AES.

The internal standard method was employed to standardize the system for water recovery and quench correction. A standard sample similar in material and identical in size to the samples being analyzed and containing an exactly known activity, is burned and counted. The ratio of tritium counts per minute (cpm) divided by AES is determined for each standard and each sample. The activity of each sample in disintegrations per minute (dpm) is given by the following relationship:

$$dpm_{sample} = \left(\frac{cpm}{AES}\right)_{sample} \times (dpm)_{standard} \times \left(\frac{AES}{cpm}\right)_{standard}$$

The standard is conveniently prepared by measuring onto a filter tablet material (Whatman No. 5272) a standard activity of tritium in water or toluene with a microliter syringe. The standard is then dried in the capsule as described above and burned in the combustion tube according to the procedure described above. The determination of an individual quench correction for each sample is necessary since the quench correction varies over a range of a few percent for identical samples.

Table 1 shows the typical scintillation counting efficiencies observed with a solvent comprising a mixture of dioxane and toluene (Herberg J. Anal. Chem., 32, 42 (1960)).

TABLE I

Typical Counting Efficiencies Using Diotol Solvent

| Sample | Range of counting efficiency % |
| --- | --- |
| $^3H_2O$ in unoxygenated solvent | 20–22 |
| $^3H_2O$ in oxygen sat. solvent (no sample combustion) | 15–18 |
| Filter pulp in Lexan capsule (no nitrogen oxides) | 15–16 |
| Wool felt in gelatin capsule (nitrogen oxides from protein) | 10–13 |

The water recovery correction can be determined separately by burning a standard and comparing it with the same quantity of standard added directly to the solvent in a vial. Preferably, the solvent is used for collection of an inactive sample so that its quench correction will be in the same range as the burned standard. The following relationships may be used for separate measurement of the recovery and quench corrections:

$$(dpm)_{sample} = (cpm)_{sample} \times R \times Q$$

$$R = \text{recovery correction} = \left(\frac{cpm}{AES}\right)_{unburned\ standard} \times \left(\frac{AES}{cpm}\right)_{burned\ standard}$$

$$Q = \text{quench correction} = (dpm)_{unburned\ standard} \times \left(\frac{AES}{cpm}\right)_{unburned\ standard} \times \left(\frac{1}{AES}\right)_{sample}$$

The above relationships given for quench correction are based upon a proportional relation between the cpm and AES for a sample. If any other method of determining quench correction is used, it may also be combined with the recovery correction as shown.

EXAMPLE 2

This example is designed to illustrate the lack of a carryover of a small fraction of a sample to contaminate the following sample in a continuous combustion operation where a series of samples are to be analyzed. Such a carryover effect would cause serious errors where a low activity sample is burned after a high activity sample. The results of the test are set forth in Table 2.

In runs Nos. 1–20 various sized pieces of filter tablet were placed in gelatin capsules and 50 μl of tritiated toluene were then added. An empty capsule containing no activity was burned between each sample containing tritium. Diotol solvent and a mixed copper-manganese oxide catalyst were used in all tests in this example. The hopcalite contained 8 atoms of manganese to 1 of copper, although some variation in this ratio is acceptable. In this series of tests, the carryover of activity from a tritiated sample to a following inactive sample did not exceed 0.1 percent. Diotol has the following composition: toluene (350ml), methanol (210 ml), dioxane (350 ml), naphthalene (73 g), PPO (4.6 g), POPOP (0.08 g).

Runs No. 21–36 were similar to 1–20, exception being the use of tritiated biotin in ethanol solution to represent a nonvolatile, slow burning form of tritium, and the substitution of discs of wool felt for the filter tablet. The wool felt was employed to provide a closer simulation to the protein content of tissue samples. The carryover in the second series did not exceed 0.2 percent. There being no evidence of a cumulative effect in these tests, samples may be run consecutively and continuously without intermediate washing steps.

TABLE II

Test of Analytical Behavior of the Method

| Sample | Sample weight mg[b] | Activity cpm backgrd. 10 cmp[c] | Carry-over % | Counting Efficiency % | Recovery %d | Av. Collection efficiency, %[e] |
|---|---|---|---|---|---|---|
| Gelatin Capsule + ³H-toluene, 50$_x$[a] | 200 | 12903 |  | 13.4 | 98.6 | . |
| do. | 150 | 5 | 0.04 |  |  |  |
| do. | 200 | 14819 |  | 15.1 | 100.7 | . |
| do. | 150 | 7 | .05 |  |  |  |
| Gelatin Capsule + ³H-toluene, 50$_x$[a] + filter tablet | 327 | 12921 |  | 13.0 | 102.0 | . |
| do. | 150 | 0 | 0 |  |  |  |
| do. | 345 | 12637 |  | 12.9 | 100.7 | . |
| do. | 150 | 5 | .04 |  |  |  |
| do. | 388 | 14220 |  | 14.7 | 99.2 | . |
| do. | 150 | 2 | .01 |  |  |  |
| do. | 500 | 16494 |  | 16.4 | 102.6 | 95.5 |
| do. | 150 | 6 | .04 |  |  |  |
| do. | 472 | 12838 |  | 13.7 | 96.1 | . |
| do. | 150 | 2 | .02 |  |  |  |
| do. | 595 | 16133 |  | 15.9 | 103.9 | . |
| do. | 150 | 2 | .01 |  |  |  |
| do. | 675 | 12055 |  | 12.5 | 98.1 | . |
| do. | 150 | −3 | 0 |  |  |  |
| do. | 740 | 11461 |  | 11.9 | 98.3 | . |
| do. | 150 | 11 | .10 |  |  |  |
| Gelatin Capsule + ³H-biotin in ethanol, 50$_x$ + wood reft | 295 | 36852 |  | 12.5 | 93.2 | . |
| do. | 150 | 32 | 0.09 |  |  |  |
| do. | 295 | 40576 |  | 12.5 | 103.1 | . |
| do. | 0 | 8 | .02 |  |  |  |
| do. | 355 | 34757 |  | 11.4 | 96.5 | . |
| do. | 150 | 58 | .17 |  |  |  |
| do. | 340 | 35872 |  | 11.0 | 103.1 | . |
| do. | 150 | 20 | .06 |  |  |  |
| do. | 415 | 33166 |  | 10.4 | 101.6 | 96.8 |
| do. | 150 | 37 | .11 |  |  |  |
| do. | 400 | 31707 |  | 10.1 | 99.3 | . |
| do. | 150 | 24 | .08 |  |  |  |
| do. | 470 | 32166 |  | 10.0 | 101.7 | . |
| do. | 150 | 25 | .08 |  |  |  |
| do. | 460 | 33888 |  | 10.5 | 101.7 | . |
| do. | 150 | 51 | .15 |  |  |  |
|  |  |  |  | S.D.: | 2.9 |  |

[a]Preceded by eight samples of ³H-toluene ranging from 20 to 470 mg.
[b]Includes capsule weight of 150 mg.
[c]Counts were 1 min, giving a coefficient of variation of < 1.0%.
[d]Since these are internal standards, average recovery is 100%.
[e]Determined by comparison with standards in solvent.

EXAMPLE 3

This Example compares the results obtained with the system of the invention with those obtained by the above-described oxygen flask procedure. The samples were rat liver homogenate from animals closed with tritiated biotin suspended in 0.25 M sucrose solution. For the determinations according to the invention, 1.00 ml samples of homogenate were evaporated at 90°C in hardened gelatin capsules. The dried samples weighed about 200 mg. including the capsule without cap. The oxygen flask combustions were done on 1.00 ml. samples of homogenate dried in cellulose bags under infrared lamps. Methanol-toluene solvent was used in both procedures. The determinations according to the invention were carried out in duplicate, and compared with average duplicate determinations of each sample by the oxygen flask method. A single counting efficiency correction factor was used for all the oxygen flask determinations. Each determination according to the invention was corrected individually for a counting efficiency which was between 8 and 10 percent. The tritium activity of the samples averaged 150,000 dpm, and they were counted for 1 minute with a coefficient of variation <0.3 percent. The results are set forth in Table 3.

TABLE III

| SAMPLE | % recovery based on oxygen flask values for duplicate det. by combustion tube method | |
| --- | --- | --- |
| 1 | 101.0, | 99.3 |
| 2 | 100.3, | 100.8 |
| 3 | 103.3, | 100.3 |
| 4 | 96.7, | 95.4 |
| 5 | 106.7, | 104.4 |
| 6 | 103.8, | 100.0 |
| 7 | 104.4, | 100.4 |
| 8 | 97.8, | 97.1 |
| 9 | 100.8, | 97.2 |
| 10 | 101.7, | 100.4 |

These results demonstrate the superiority of the system of the present invention to the oxygen flask method in that similar results are obtained although the system of the invention is much simpler to operate and is capable of handling a great number of samples in a short period of time.

It should be further pointed out that the danger of explosion is greatly reduced in the system of the present invention, inasmuch as the oxygen mixes with the solvent only in the cold collector portion of the system, where the vapors are carried out the drain tube.

The present invention also includes an improved carbon dioxide collector system for collecting active carbon-14 for scintillation analysis. The system may be used in conjunction with the above-described combustion tube system wherein samples are burned yielding active carbon dioxide.

In the oxygen flask procedure, the carbon dioxide is absorbed over a period of a half hour or more, using Woeller's phenethylamine solvent. (Woeller, Anal. Biochem. 2, 408, (1962)). Other methods include absorption of the radioactive carbon dioxide in cold scintillation solvent by diffusion or bubble trap systems or by freezing out the $CO_2$ in a liquid nitrogen trap with subsequent solvent absorption. These methods are effective but slow and inefficient and do not enable the collection of a large number of samples in a short period of time. The system according to the invention permits the collection of carbon dioxide efficiently from the relatively large volume of oxygen flow from the above-described combustion system in a relatively small volume of scintillation solvent.

Figure 3:
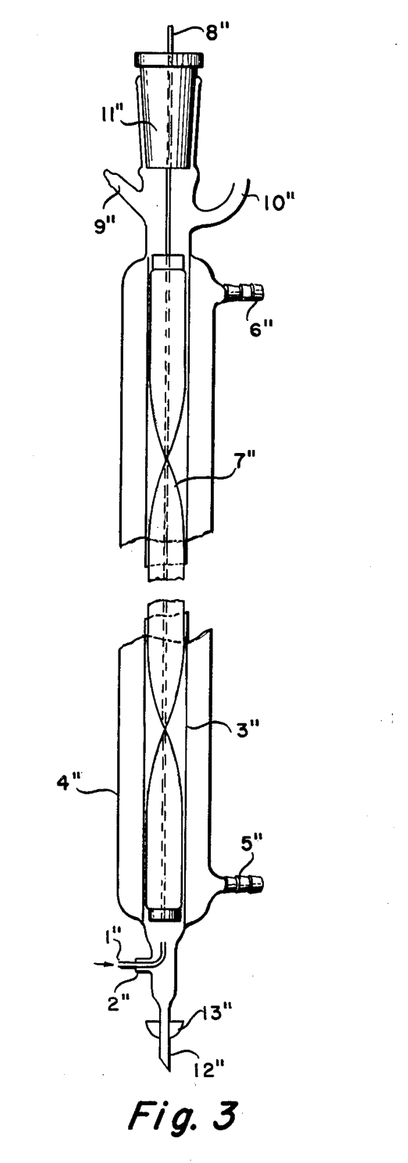
FIG. 3 is a front elevational view of the active carbon dioxide collector apparatus.

Referring to FIG. 3, the condenser like assembly is mounted vertically beside the combustion tube. A delivery tube 1'', preferably of Teflon, is connected to the tapered outlet 17'' of the combustion tube of FIG. 2 with a short piece of tubing (not shown), preferably of silicone rubber. The delivery tube 1'' is sealed into the bottom of the collector assembly and its tip pointed upward therein. The assembly is provided with a solvent inlet means 9'' and an oxygen outlet means 10'' at the top thereof. The solvent pump means (not shown) and rate of solvent flow is the same as described for water collection. The delivery tube 1'' is positioned within tube 3'' which is completely enclosed by condenser-like tube 4'' which is provided with coolant inlet and outlet means 5'' and 6''. Disposed within tube 3'' is helical band 7''. The helical band 7'' is adapted for rotation within tube 3'' around spinner shaft 8''. Shaft 8'' extends through and is adapted for free rotation within stopper 11''. The helical band 7'' is shaped such that the edges thereof contact the inner walls of the tube 3'' in such a manner that, upon rotation, the band maintains a thin, smooth film of solvent on the walls after introduction through inlet 9''. The solvent film must be such that no bare zones or pools of solvent form on the walls.

Generally, smaller bores of tubing, lower rotational speeds of the helical band and higher temperatures of operation tend to decrease the efficiency of the system. By employing a sufficiently large bore in tube 3'', which provides a sufficiently slow flow velocity of oxygen, moderate variations in rotational speed of the helical band 7'' and cooling temperatures, as well as imperfections in the sweep of the glass wall by the edges of the band, are not critical. Generally, the diameter of the inner bore of tube 3'' may vary from about 15 to about 20 mm, a diameter of about 17.4 mm being preferred. The rotational speed of the helical band 7'' may vary from about 2,500 to about 4,000 rpm with a speed of about 3,600 rpm being preferred. The coolant may be held at about 0°C.

The bottom of the tube 3'' is provided with delivery means 12'' and liquid trap 13''. The liquid trap 13'' functions in the same manner as the cup member of 29' of FIG. 2 to prevent condensate from the atmosphere from dripping into the container employed to catch the sample.

The helical band 7'' is preferably constructed by tearing strips of 100 mesh stainless steel screen to the proper width and setting a twist therein by mounting in a lathe and carefully rotating. A helix consisting of two strips may be assembled onto a length of stainless steel rod (8'') by spot welding the ends together with reinforcing strips. The edges of the screen are then "feathered" by removing a few strands of wire and the desired fit to the glass wall is achieved by gentle bending of the feathered edge.

The operation of the system for carbon dioxide collection is identical to that described for water collection with the exception that a different solvent is used and the solvent flow precedes the dropping of the sample into the combustion tube. In the case of tritiated water collection, the solvent flow is started at the same time a sample is dropped into the combustion tube. In the $CO_2$ collector, the sample is not dropped into the combustion tube until the flow of solvent has reached the bottom of the collector assembly.

The scintillation solvent used comprised toluene (430 ml) methanol (300 ml), phenethylamine (270 ml), 2,5-diphenyloxazole (PPO) (5 g), dimethyl [2,2'-phenylene-bis-(5-phenyloxazole)] (POPOP) (0.5 g). The collection system absorbs nitrogen oxides very efficiently, which causes a serious quenching of the scintillation solvent unless dimethyl POPOP is employed.

As with water collection, the sample size capacity of the system is determined by the capacity of the solvent to absorb $CO_2$. If the sample size is larger than about 400 mg including the capsule, precipitation tends to occur in the collector. There is no decrease in the efficiency of the absorption of the $CO_2$ when precipitation occurs; however, if the amount of precipitate is large it will not be completely washed out of the collector in one pass. In such cases, a second or third solvent rinse cycle may be necessary to remove all of the precipitate. The formation of precipitate is not detrimental as long as it is followed by sufficient clear solvent to carry all

TABLE IV

| | OXYGEN FLASK METHOD | | | RAPID COMBUSTION METHOD | | | |
|---|---|---|---|---|---|---|---|
| Sample and size[a] | Corrected cpm[b] | % recovery[c] | Sample size[a] | Corrected cpm[b] | % recovery[c] | % carryover[d] |
| Plasma 1.5 ml | 27622 | 99.8 | 1.7 ml | 27941 | 100.9 | 0.19 |
| | 27201 | 98.2 | | 28014 | 101.2 | .16 |
| | 27505 | 99.0 | | 28128 | 101.6 | .16 |
| Carcass 100 mg | 27863 | 100.6 | 121 mg | 27785 | 100.3 | .20 |
| | 27637 | 99.8 | | 27022 | 97.6 | .08 |
| | 27519 | 99.4 | | 27127 | 98.0 | .16 |
| Small intestine 347 mg | 27320 | 98.7 | 231 mg | 27364 | 98.8 | .34 |
| | 27015 | 97.6 | | 27792 | 100.4 | .21 |
| | 27360 | 98.8 | — | — | — | — |
| Large intestine 138 mg | 27578 | 99.6 | 92 mg | 28171 | 101.7 | .28 |
| | 27230 | 98.3 | | 27692 | 100.0 | .20 |
| | 28030 | 101.2 | 23 mg | 27951 | 100.9 | .34 |
| Kidney 50 mg | 26996 | 97.5 | 33 mg | 27729 | 100.0 | .92 |
| | 27282 | 98.5 | | 27446 | 99.1 | .64 |
| | 27570 | 99.6 | | 27766 | 100.3 | .45 |
| Liver 150 mg | 27540 | 99.4 | 180 mg | 27770 | 100.3 | .90 |
| | 27056 | 97.4 | | 27342 | 98.7 | .90 |
| | 27031 | 97.6 | | 27775 | 100.3 | .41 |
| Muscle 96 mg | 27345 | 98.8 | 63 mg | 27538 | 99.5 | .62 |
| | 27711 | 100.1 | | 27746 | 100.2 | .16 |
| | 27266 | 98.5 | — | | | |
| Mean: | 27408 | 99.0 | Mean: | 27690 | 100.0 | .34 |
| S.D.: | 281 | 1.02 | S.D.: | 314 | 1.13 | .25 |

[a]Samples were of mouse tissue homogenized in distilled water, dry weights of tissue given (except for the plasma, which was human, volume before drying given).
[b]Counts per minute (cpm) values were corrected by subtracting background (19 cpm) and by reducing each to a common counting efficiency of 65%. The rapid combustion method values were corrected for a collection efficiency of 97.4%. The oxygen flask values were corrected for the aliquot factor and the effect on counting efficiency of a different volume in the counting vial than with the rapid combustion samples. The cpm were based on 10 min counts.
[c]For comparison purposes, the mean cpm of the rapid combustion method is assumed to represent 100.0% recovery. The separately measured absolute recovery of 97.4% is corrected for in b.
[d]This represents the percent of activity of that sample which appears in an untagged sample (empty capsule) burned and collected immediately following the active sample.

of the precipitate to counting collector. Generally, a sample size up to about 400 mg. is suitable for $CO_2$ collection.

The system may be employed for the collection of tritiated water and/or carbon dioxide. It is not particularly desirable to employ the $CO_2$ collection system for the recovery of water, however, unless it is desired to count both isotopes together in the same solvent, because the counting efficiency for tritium is about half of that obtained when the water collector is used.

Quench and recovery corrections are made as described above in connection with water collection. In the following examples the window settings in the counter used for $CO_2$ counting with the above-described solvent were: 40 to 1,000 at 20 percent gain for the carbon-14 count and 1,000 to infinitely at 50 percent gain for the automatic external standardization count.

EXAMPLE 4

A comparison was made between the rapid combustion method of the present invention and the oxygen flask procedure for $CO_2$ collection and counting. Analyses of identical samples of mouse tissue homogenates containing identical doses of carbon-14 were conducted. The samples were evaporated in cellulose bags for the oxygen flask procedure and in hardened gelatin capsules for the combustion method of the invention. The carbon-14 was added in the form of methylglyoxal-bis-guanyhydrazone 14C which had demonstrated a failure to lose activity under the evaporation conditions employed. In the combustion method of the invention, a mixed copper-manganese oxide catalyst was employed. The results are set forth in Table 4.

The two methods agree within 1%; their precision being identical. Inasmuch as the $CO_2$ collection system of the present invention is capable of handling a large number of samples in a relatively short period of time as compared with the oxygen-flask method, the invention represents a significant improvement over the prior art.

In general there are several key features which make this combustion system different than prior art systems and which are essential to its success. These features include the use of hopcalite, the use of a chimney in the combustion chamber to control the flow of oxygen and combustion gasses, the encapsulation of the sample in convenient containers which also serve as evaporation vessels, and the unique design of collectors to mix the water and carbon dioxide with scintillation solvent. All other combustion systems which have been developed for scintillation analysis have been impractical because of the lack of simple, rapid, direct means of automatically absorbing the combustion products in scintillation solvent.

What is claimed is:

1. An apparatus for the collection of a carbon dioxide containing gaseous combustion product comprising an externally cooled, vertical tube having positioned coaxially therein and adapted for high speed rotation therein about its longitudinal axis, an elongated strip of inert material having a planar surface in the shape of a helix, said tube containing at the upper end thereof a solvent inlet means and an oxygen outlet means and at the bottom thereof a liquid outlet means, said strip of inert material being a screen-like material having the edges feathered by removal of the outermost longitudinal strands to thereby leave the ends being in contact with the inner bore of said tube such that upon rotation of said strip, and the introduction of solvent to said tube, said strip distributes a thin, substantially uninterrupted film of said solvent over the walls of said tube.

2. The apparatus of claim 1 wherein said tube is coaxially positioned within a second tube having a diameter such that a space is provided between the outer wall of said first tube and the inner wall of said second tube.

3. The apparatus of claim 2 wherein said second tube contains a cooling liquid inlet and outlet means.

* * * * *